(12) United States Patent
Thiel et al.

(10) Patent No.: US 9,130,410 B2
(45) Date of Patent: Sep. 8, 2015

(54) COMMUNICATION WITH DISTRIBUTED DEVICES HANDLING ELECTRIC ENERGY VIA THE INTERNET

(71) Applicant: SMA Solar Technology AG, Niestetal (DE)

(72) Inventors: Raimund Thiel, Bad Zwesten (DE); Veit Dominik Kunz, Kassel (DE); Dirk Schlote, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 273 days.

(21) Appl. No.: 13/630,293

(22) Filed: Sep. 28, 2012

(65) Prior Publication Data
US 2013/0086219 A1    Apr. 4, 2013

(30) Foreign Application Priority Data
Sep. 29, 2011   (DE) .................. 10 2011 054 036

(51) Int. Cl.
*H02J 13/00*    (2006.01)
*H04L 29/08*    (2006.01)
*H04L 29/06*    (2006.01)

(52) U.S. Cl.
CPC ............. *H02J 13/0079* (2013.01); *H04L 67/12* (2013.01); *H04L 69/24* (2013.01); *Y02B 70/3216* (2013.01); *Y02E 60/7869* (2013.01); *Y04S 20/221* (2013.01); *Y04S 40/128* (2013.01)

(58) Field of Classification Search
CPC ....... H04L 61/2069; H04L 12/12; H02J 3/00; H02J 3/06; H02J 3/008; H02J 3/14; H02J 3/28; H02J 3/381; H02J 13/0079; H04J 9/06; G06Q 50/06

USPC .......... 709/203, 217, 223, 224, 229; 700/286, 700/287, 295
See application file for complete search history.

(56) References Cited

U.S. PATENT DOCUMENTS

| | | | | |
|---|---|---|---|---|
| 7,133,787 B2* | 11/2006 | Mizumaki | | 702/62 |
| 8,710,692 B2* | 4/2014 | Bettermann et al. | | 290/55 |
| 8,751,036 B2* | 6/2014 | Darden et al. | | 700/219 |
| 2003/0212512 A1* | 11/2003 | Hart | | 702/57 |

(Continued)

FOREIGN PATENT DOCUMENTS

| | | |
|---|---|---|
| DE | 102007022879 A1 | 11/2008 |
| DE | 102009003173 A1 | 11/2010 |
| WO | 2009103291 A1 | 8/2009 |

*Primary Examiner* — Ramy M Osman
(74) *Attorney, Agent, or Firm* — Eschweiler & Associates, LLC

(57) ABSTRACT

A method of communication of distributed devices handling electric energy with communication partners via the Internet includes programming rules in a server. The rules determine between which device and which communication partner a communication connection is to be mediated based on generic properties of the devices, generic properties of the communication partners and an initializing time-variable datum. The communication connection is a point to point, point to multi point or multi point to multi point connection via the internet. Data are transmitted from each device and each communication partner to the server via the Internet. These data include both a communication address and attributes indicative of the generic properties of the device or the communication partner, respectively. The communication connection is mediated between the device and the communication partner determined by the rules in response to a value of the initializing time-variable datum also defined by the rules.

13 Claims, 1 Drawing Sheet

(56) References Cited

U.S. PATENT DOCUMENTS

| | | | |
|---|---|---|---|
| 2003/0236593 A1* | 12/2003 | Schumacher | 700/291 |
| 2004/0158417 A1* | 8/2004 | Bonet | 702/57 |
| 2004/0167676 A1* | 8/2004 | Mizumaki | 700/286 |
| 2007/0271006 A1* | 11/2007 | Golden et al. | 700/295 |
| 2008/0294472 A1* | 11/2008 | Yamada | 705/7 |
| 2009/0168685 A1* | 7/2009 | Olivier et al. | 370/312 |
| 2009/0312881 A1* | 12/2009 | Venturini Cheim et al. | 700/297 |
| 2010/0231160 A1* | 9/2010 | Shaffer et al. | 320/101 |
| 2011/0055322 A1 | 3/2011 | Gregersen | |
| 2011/0221269 A1 | 9/2011 | Boerger et al. | |
| 2012/0059532 A1 | 3/2012 | Reifenhaeuser et al. | |
| 2012/0303300 A1* | 11/2012 | McDonald et al. | 702/62 |
| 2012/0317428 A1* | 12/2012 | Liu et al. | 713/310 |
| 2013/0211605 A1* | 8/2013 | Mansfield et al. | 700/286 |

* cited by examiner

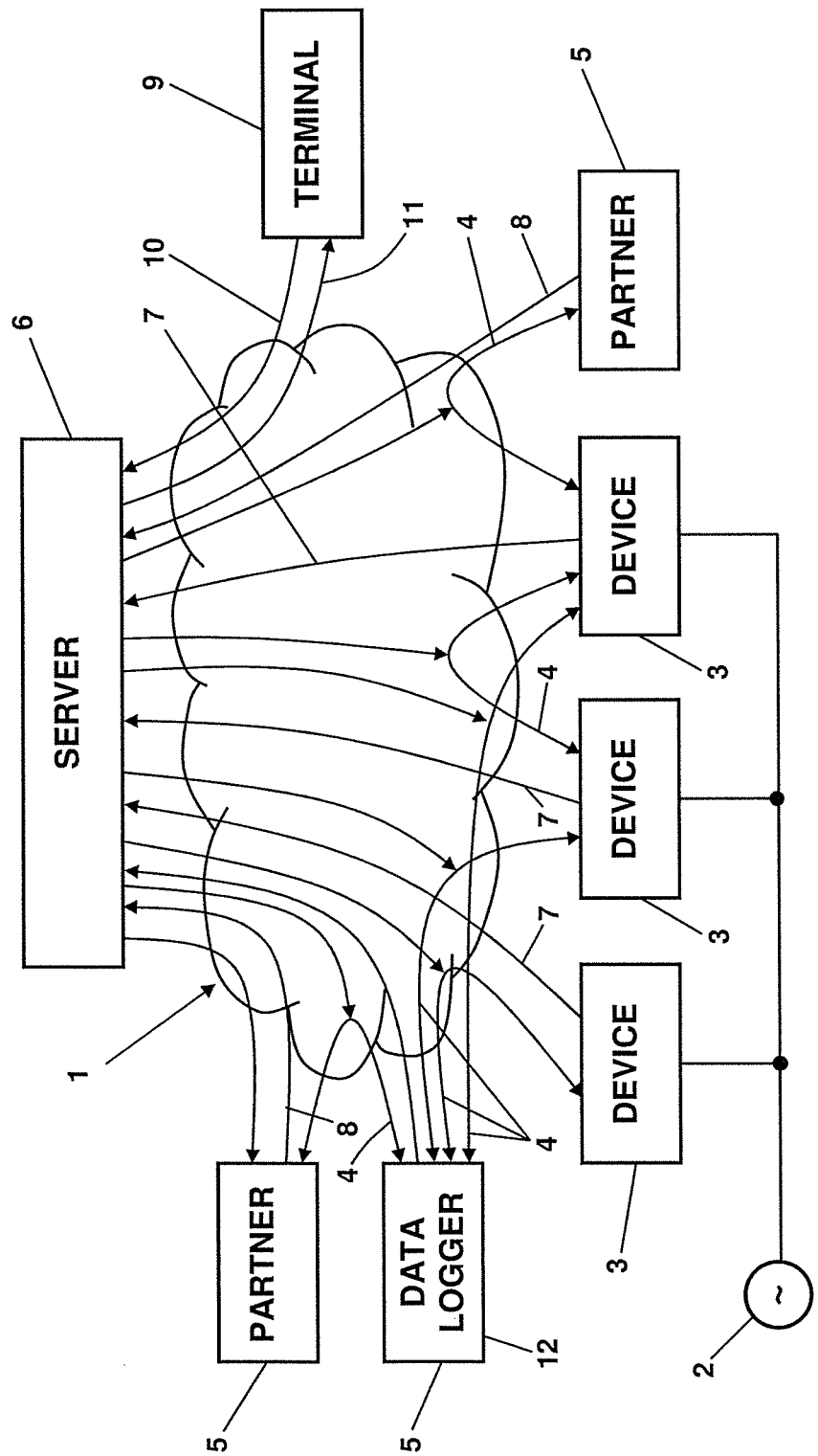

COMMUNICATION WITH DISTRIBUTED DEVICES HANDLING ELECTRIC ENERGY VIA THE INTERNET

REFERENCE TO RELATED APPLICATION

The application claims priority to German Patent Application number DE 10 2011 054 036.9 filed on Sep. 29, 2011.

FIELD

The present invention relates to a method of communication with decentral or distributed devices handling electric energy via the Internet.

PRIOR ART

DE 10 2009 003 173 A1 discloses a method of directed transfer of electric energy in an electric power grid. Here, a data package and an energy package are routed to a receiver which may be determined by information in the data package.

DE 10 2007 022 879 A1 discloses a data network to which a plurality of devices providing electric energy is connected. These devices include inverters which are in turn connected to photovoltaic generators. Other power generators may also be provided. The data network together with the inverters forms one communication unit. Via the data network, the individual inverters are controlled by a control unit in such a way that they are combined to a virtual power unit with regard to overall parameters of their feed-in into an AC power grid. Particularly, the individual inverters may be connected to the Internet. Then, the inverters initiate communication connections to their communication partners via the Internet according to usual Internet protocols based on client-server-methods.

A method of providing connectivity between clients connected to the Internet is known from WO 2009/103291. Here, a first client connects to a control server at which client-specific connection information with regard to the first client is registered. If a web browser application running on the first client requests a contact with a second client by means of an enquiry including a specific URI (Uniform Resource Identifier), the control server mediates a direct connection between the first client and the second client which is determined by the specific URI. This point to point connection is used to transfer data, which are related to the web browser application, to the client.

The mediation of point to point connections in the Internet belongs to so-called peer to peer methods of communication between equal participants which may both be providers and users of services. Point to point connections in the Internet may be mediated via different protocols, like for example the so-called Session Initiation protocol (SIP) or the so-called Session Traversal Utilities for NAT (STUN), wherein the latter protocol serves for penetrating firewalls and routers of the individual clients to be able to build up a bidirectional communication connection despite the limitations usually set by such firewalls and routers.

There still is a need for a method of communication with distributed devices handling electric energy via the Internet which meets the particular requirements for communication with such devices. This not only includes means for operating virtual power plants by concerted control of a plurality of such devices but also for service, remote diagnois, remote surveillance, data collection of operation parameters, modification of operation parameters of such devices and so on.

SUMMARY

The present invention provides a method of communication of distributed devices handling electric energy with communication partners via the Internet. This method comprises providing a server and programming rules in the server. The rules determine between which at least one device and which at least one communication partner a communication connection is to be mediated based on generic properties of the devices, generic properties of the communication partners and an initializing time-variable datum. The communication connection is selected from a group of connections consisting of point to point, point to multi point and multi point to multi point connections via the Internet. The method further comprises transmitting data from each device to the server via the Internet, the data including both a communication address and attributes indicating the generic properties of the device, and transmitting further data from each communication partner to the server via the Internet, wherein the further data includes both a communication address and attributes indicating the generic properties of the communication partner. The method also comprises mediating the communication connection between the at least one device and the at least one communication partner determined by the rules in response to a value of the initializing time-variable datum also defined by the rules.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWING

The invention can be better understood with reference to the following drawing. The components in the drawing are not necessarily to scale, emphasis instead being placed upon clearly illustrating the principles of the present invention. In the drawing, like reference numerals designate corresponding parts throughout the several views.

FIG. 1 illustrates a communication with distributed devices handling electric energy via the Internet.

DETAILED DESCRIPTION

The distributed devices handling electric energy may be any devices generating, providing, transforming, or consuming electric energy, or surveying or monitoring the flow of, electric energy. This definition, for example, covers power plants and solar power plants plus generators, batteries, battery management systems, converters, inverters, transformers, measurement devices, electric meters, grid connection points and grid nodes, plus all consumers of electric energy. Often, the parts of these devices with which a communication actually takes place are controllers of the devices or installations monitoring or surveying the devices. These controllers or installations may even be separate units which are separated from the remainder of the devices handling electric energy.

One common feature of wind power plants and solar power plants is that a single one of them does not provide particularly high electric power. However, a plurality of such devices is able to provide electric power which is comparable to that of a large conventional power plant. Other than with a conventional power plant, however, due to the spatial distribution of the individual devices over a comparatively large area, there is a communication problem when, for example, the provision of electric power by the individual devices has to be adjusted to the actual demand of electric power in a power grid to which all of the devices are connected.

In a method according to the present invention for communication with distributed devices handling electric energy via the Internet, the devices and their potential communication partners transmit data to a server via the Internet. The data from each device or communication partner include a communication address. The server, in response to an initializing time-variable datum, mediates a communication connection between at least one defined device and at least one defined communication partner via the Internet. This communication connection is a point to point connection, a point to multi point connection which may also be a multi point to multi point connection, and a multi point to multi point connection. In addition to the communication addresses, the data transmitted by the devices to the server include attributes indicative of generic properties of the devices. Correspondingly, the data transmitted by the communication partners to the server additionally include attributes indicative of generic properties of the communication partners. Rules programmed in the server determine between which at least one device and which at least one communication partner the communication connection is mediated based on the attributes of the devices and the attributes of the communication partners and the initializing time-variable datum.

A generic property of the device or the communication partner indicated by an attribute is a property which the device or the communication partner comprises in a same way as other devices and/or communication partners comprise this property. This means that the generic property does not individualize the device or the communication partner like an individual communication address, although there may be only one device or communication partner having a particular property. Generic properties of this kind for example include the manufacturer, the model, the type, the design, the construction, the operation status (on/off) and all information with regard to dimensioning the respective device or the respective communication partner. Further, the state of the firmware, the owner or operator, the name of a superordinate system to which the device belongs, the power grid connection area and the spatial position area of the respective device or the respective communication partner belong to such generic properties. No generic properties according to this definition are the individual device identification or the communication address of the respective device or communication partner or the present values of their operation parameters like the presently provided, consumed or transformed electric power.

An initializing time-variable datum may be any data value which changes with time. This definition particularly includes a timing signal which is generated in the server. It may, however, also be a datum which is included in the data transmitted by the devices or the communication partners to the server in addition to the communication addresses and the attributes. It may particularly be a request for contact. In the method of the present invention, the initializing time-variable datum, however, is no request for mediating a communication connection with a certain device or a certain communication partner defined by their communication addresses but always a generic request for contact based on which the server determines between which device and which communication partner the communication connection is mediated.

A generic request for contact is to be understood as a request for contact with devices or communication partners which are not directed to certain individual devices or individual communication partners but to devices or communication partners selected by their attributes and/or their present operation data. The generic request for contact does not yet individualize the respective devices and communication partners with which a contact is desired. Such a generic request for contact may also be interpreted as a part of the rules according to which the server determines between which device or which devices and which communication partner or which communication partners a communication connection is mediated. In other words, such a request for contact may also be interpreted as temporarily programming a rule in the server.

In addition to the communication according to the present invention, the method of the present invention may also accept and cater to requests for mediation of a communication connection with a certain individual device or a certain individual communication partner identified by their communication address.

The initializing time-variable datum may particularly be a current or present operation parameter of one of the devices which the respective device transmits to the server. The operation parameters of one of the devices may include all, particularly all physical values, which describe the present operation state of the device. This particularly includes, but is not limited to, the electric power presently provided by the respective device. In addition, the operation parameters may include all present currents and voltages both at the input side and at the output side, all temperatures, control signals, efficiencies, power reserves, leak voltages, isolation resistances and so on.

In the new method, using the rules programmed in the server, the communication connections are not mediated causatively based on a request for a certain device or for a certain communication partner, but causatively based only on generic information about the device and its potential communication partners and on the also generic initializing time-variable datum. It is to be understood that, for the practical or actual mediation of the communication connection between the at least one device and the at least one communication partner, their communication addresses are needed. These communication addresses, however, are not involved in the decision whether and between whom the communication connection is mediated. They are only needed for mediating the communication connection for which the server decided on another basis.

The rules programmed in the server in the method according to the present invention may vary strongly. One example for a rule is: connect those inverters whose operation parameters indicate a malfunction to service computers of the manufacturer of the inverter. Another rule may be: connect those devices which at present feed more power than a predetermined percentage of their nominal power into an AC power grid in a particular area to a control computer of the network operator to reduce the power fed to the predetermined percentage.

The rules may also include timing targets according to which certain connections are repeatedly mediated at certain intervals of time. These timing targets may be programmed in that, after mediating a connection, a certain interval of time has to lapse before the same connection, although it still complies with the rules programmed in the server, is mediated again.

The communication connections mediated in the method according to the present invention may be point to point connections or point to multi point connections including multipoint to point connections or even multi point to multi point connections; in each case the server is no longer involved in the connection after it has been established. Thus, the server may be kept free from the data transfer occurring over these communication connections; and a transfer of, for example, security-relevant data via the server is avoided.

The communication connection between the at least one device and the at least one communication partner may, for example, be used to transmit data transfer requests and/or commands from the communication partner to the device and data and/or command confirmations from the device to the communication partner. Generally, however, there is no limitation to the data which may be transferred via the communication connection.

The devices with which communication takes place according to the present invention particularly includes devices which are part of photovoltaic power plants, like for example so-called solar inverters feeding electric energy from photovoltaic generators into an AC power grid.

The potential communication partners may, for example, be devices for handling electric energy themselves, or surveying, monitoring or service computers for the devices, mobile terminals or data loggers from which data may be retrieved via the Internet.

In one embodiment of the method according to the present invention, the devices transfer their present operation parameters or all their data regularly at certain intervals and/or all their data regularly upon predetermined changes of values of these data to the server. The regularity of the data transfer ensures that all data relevant for an application of the rules are present in the server. A regular transfer of the data at certain intervals, i.e. also of data which have not changed in the meanwhile, may also be used as an indication that the respective device is generally able to communicate.

The communication partners may also forward at least a part of their data regularly at certain intervals and/or of their data regularly upon predetermined changes of the values of their data to the server. Here again, in one embodiment the regularity at certain intervals may be preferred over the regularity only with certain changes to indicate the general communication ability of the communication partners. Generally, both the data transferred from the devices and the data transferred from the communication partners to the server may, however, include additional communication readiness signals.

The rules in the server may be programmable by transferring program data from the communication partners to the server. This programming of the rules in the server may be limited to communication partners having certain properties or attributes in one embodiment.

The rules in the server may readily allow for devices which themselves provide or handle electric energy as potential communication partners of other devices. Further, rules may be programmed in the server according to which communication connections comprising an overlap in time may be mediated between one device and various communication partners and/or one communication partner and various devices.

Besides the data transfer via the communication connections mediated by the server according to the rules, information data may also be transferred by the server in that the data which are transferred from a communication partner to the server include generic requests for information and in that rules are programmed in the server according to which the information data are transferred to the communication partner based on the generic request for information and the attributes of the devices. These information data may be generated by the server according to the rule from operation parameters of the devices, or they may have already been generated by the server or be otherwise available to the server. For example, these information data may be summaries of operation data of devices with certain properties or attributes. A request for such information via the Internet is not only possible from communication partners which may generally also enter into a direct communication connection with individual devices, but also from other terminals like, for example, via accessing a public website.

The method of the present invention may also be used for realizing "virtual" data loggers for the operation data of devices handling electric energy. For this purpose, the server may mediate communication connections between the devices and the data logger as their communication partner at regular intervals of time via which the operation data are transferred to the data logger. The operation data stored in the data logger may be retrieved from other communication partners, wherein the communication connection used for this purpose may be mediated by the server according to the method of the present invention according to rules based on generic information. Such a data logger is "virtual" in so far as it is not located at or close to the respective device, but somewhere else so that no direct physical access to the data logger is possible at the site of the respective device.

Now referring in greater detail to the drawing, a cloud in FIG. 1 depicts the Internet 1. Via the Internet 1, communication takes place between spatially distributed devices 3, which are feeding electric energy into an AC power grid 2 or consuming electric energy from the AC power grid 2 or handling electric energy in another way, and communication partners 5 which do not handle electric energy themselves. Particularly, the communication takes place via point to point connections 4. The point to point connections 4 are mediated by a server 6 according to rules. The rules are based on attributes and operation parameters of the devices 3 which are—in addition to communication addresses of the devices 3—included in data 7 transferred to the server 6. Further, these rules are based on attributes which are—in addition to communication addresses of the communication partners 5—included in data 8 which are transmitted from the communication partners 5 to the server 6, and on an initializing time-variable datum which is either generated in the server 6 or included in the operation data of one of the devices 3 or transmitted to the server 6 from one of the communication partners 5 within its data 8. The communication addresses in the data 7 and 8 are only used to finally mediate the point to point connections 4. However, they are not used to decide between which devices 3 or between which device 3 and which communication partner 5 a point to point connection 4 is to be mediated.

The rules in the server 6 may be programmed via a communication partner 5 by means of program data included in the data 8. This includes that a request for contact may be included in the data 8 which may be used together with rules programmed in the server 6 to mediate a communication connection between the communication partner 5 and a device 3. FIG. 1 also depicts a terminal 9 which only sends generic requests for information 10 to the sever 6 and in turn receives information data 11 from the server 6 via the Internet 1, which the server 6 has generated based on the attributes of the devices 3 and the operation parameters of the devices 3 included in their data 7. Such information data 11 may also be transmitted to a communication partner 5 in response to a request for communication included in the data 8 from the communication partner 5 which generally would also be able to directly communicate with one of the devices 3, which may not be the case with the end device 9.

One of the communication partners 5 is a data logger 12 which, based on rules, is repeatedly connected by the server 6 via communication connections 4 to the devices 3 to enquire all or certain operation parameters of the devices for the purpose of storing them. Operation data stored in the data logger 12 are accessible to other communication partners 5 via the server 6, wherein the data logger 12 when mediating the communication connection 4 may be regarded as a device 3 by the server 6.

Many variations and modifications may be made to the preferred embodiments of the invention without departing substantially from the spirit and principles of the invention. All such modifications and variations are intended to be included herein within the scope of the present invention, as defined by the following claims.

What is claimed is:

1. A method of communication of distributed devices handling electric energy with communication partners via the internet, the method comprising:
    providing a server;
    programming rules in the server, the rules determining between which at least one device and which at least one communication partner a communication connection is to be mediated based on generic properties of the devices, generic properties of the communication partners and an initializing time-variable datum, the communication connection being selected from a group of connections consisting of point to point, point to multi point and multi point to multi point connections via the internet;
    transmitting data from each device to the server via the internet, the data including both a communication address and attributes indicative of the generic properties of the device;
    transmitting further data from each communication partner to the server via the internet, the further data including both a communication address and attributes indicative of the generic properties of the communication partner; and
    mediating the communication connection between the at least one device and the at least one communication partner determined by the rules in response to a value of the initializing time-variable datum also defined by the rules; and
    transmitting at least one data transfer request from the at least one communication partner to the at least one device and at least one requested datum from the at least one device to the at least one communication partner via the communication connection, or transmitting at least one command from the at least one communication partner to the at least one device and at least one command confirmation from the at least one device to the at least one communication partner via the communication connection;
    wherein the devices handling electric energy are inverters being part of at least one photovoltaic power plant or controllers of such inverters,
    wherein the communication partners are selected from a group of partners including at least one of the devices, surveying computers for the devices, monitoring computers for the devices, service computers for the devices, mobile terminals and data loggers,
    wherein the generic properties of the devices and the generic properties of the communication partners are selected from a group of properties comprising their type, their firmware, a state of their firmware, their design, their construction, their operation state, their dimensions, their owner, their operator, a name of a superordinated system, their grid connection area and their spatial position area.

2. The method of any of the preceding claims, wherein the initializing time-variable datum is a timing signal generated in the server.

3. The method of claim 1, wherein the initializing time-variable datum is a datum included in the data transmitted from of at least one of the devices and the communication partners to the server in addition to its communication address and attributes.

4. The method of claim 3, wherein the initializing time-variable datum is selected from a present operation parameter of at least one device and a generic contact request by at least one communication partner.

5. The method of claim 1, wherein the devices transmit at least a part of their data to the server at fixed intervals.

6. The method of claim 1, wherein the devices transmit all of their data to the server upon certain changes of a value of any of these data.

7. The method of claim 1, wherein the communication partners transmit at least a part of their data to the server at fixed intervals.

8. The method of claim 1, wherein the communication partners transmit all of their data to the server upon certain changes of a value of any of these data.

9. The method of claim 1, wherein the data transmitted by at least one of the devices and communication partners to the server further comprise a communication readiness signal.

10. The method of claim 1, wherein the rules in the server are programmed by transferring program data from at least one of the communication partners to the server.

11. The method of claim 1, wherein the rules in the server are programmed by transmitting program data from at least one of the communication partner comprising predetermined properties to the server.

12. The method of claim 1, wherein the rules in the server mediate different communication connections having an overlap in time between at least one of the devices and different communication partners or between at least one of the one communication partners and different devices.

13. The method of claim 1, wherein the server, in response to a generic request for information via the internet, based on the attributes transmitted by the devices, transfers information data generated by the server from the operation parameters of the device.

* * * * *